3,002,832
METHOD FOR REDUCTION TREATMENT OF MOLTEN IRON BEARING SLAG TO OBTAIN THE CONTAINED IRON AND TO DRAW ADVANTAGE OF HEAT ENERGY CONTENT
Lucas S. Moussoulos, 2 Hersonos St., Athens, Greece
No Drawing. Filed July 10, 1959, Ser. No. 826,117
Claims priority, application Greece Jan. 15, 1959
7 Claims. (Cl. 75—24)

This invention relates to a method of treating molten iron bearing slag for the recovery of iron.

In some metallurgical processes, such as in the production of FeNi alloy from nickel bearing iron ores (Patent 19,041/1958), slag is produced at high temperatures (1600° C.), and this slag also contains a considerable iron content (25–30%).

An object of the present invention is to recover the iron values from slags. Other objects and advantages will become apparent on further study of the specification and appended claims.

The proposed method refers to the reduction treatment of such molten slag, resulting in the recovery of the contained Fe. Further the heat content of the molten slag is also utilized, reducing the consumption of heat energy. Under these conditions, the proposed process appears as a supplementary step of a preceding metallurgical treatment. It is conducted as follows:

The molten iron bearing slag produced during the preceding metallurgical treatment, which for reasons of simplicity we name slag A, is introduced into an electric (or other kind) furnace. To the same furnace, a mixture of iron ore, flux and reduction fuel is simultaneously charged.

This simultaneous charging is regulated in such a way, as to obtain, as far as possible, a uniform mixture of the solid materials with the molten slag A. Slag A provides heat and forms together with the solid materials a semimolten or plastic mass, in which the reduction fuel (coke breeze, etc.) remains dispersed, so that reduction starts immediately.

The added ore and flux are regulated in quantity and quality so as to permit the resulting mass to have as high as a temperature as possible (1200° C.) and to provide with regard the new slag, about to be formed—which we name slag B—the required characteristics of fusibility.

In order to cause a more drastic reduction, the temperature of above mass is raised to the highest possible level, which the fusibility characteristics of slag B permit, without bringing about the development of a liquid phase. Thus complete reduction is achieved in the considerably short time of about two hours.

After reduction is completed, the temperature is raised further, to the level where the whole mass becomes fluid and specifically to the temperature level where the reduced metal is molten (1300° C.). At this stage the metal is separated by gravity from slag B and is collected in the form of cast iron or semi-steel. The final highest temperature level required depends eventually on the fusibility of slag B and influences considerably the P, Cr, etc. content of the produced cast iron, in the event that such elements are present.

It will be understood that the invention is susceptible to modification in order to adapt it to different usages and conditions, and, accordingly, it is desired to comprehend such modifications within the invention as may fall within the scope of the appended claims.

I claim:

1. A process for recovering iron from molten iron-bearing slag which comprises the steps of: simultaneously mixing in a furnace said molten iron-bearing slag, with solid reducing agent, with iron ore, and with flux in sufficient quantities to result in a semi-molten mass, wherein said solid reducing agent is dispersed uniformly in said mass; reacting said mass in the semi-molten state to reduce the iron values into elemental iron; heating said semi-molten mass containing elemental iron to a temperature at which said elemental iron is molten; and separating said molten iron from the remaining mass.

2. The process of claim 1, wherein said molten iron-bearing slag is at 1550–1600° C. prior to being mixed.

3. The process of claim 1, wherein said semi-molten mass is reacted at a temperature up to 1200° C.

4. The process of claim 1, wherein the solid reducing agent is coke breeze.

5. The process of claim 3, wherein said semi-molten mass is reacted at 1200° C.

6. The process of claim 5, wherein said semi-molten mass is reacted for two hours.

7. A process for recovering iron from molten iron-bearing slag which comprises the steps of: simultaneously mixing into a furnace a molten iron-bearing slag having an iron content of about 25–30%, said slag being at 1550°–1600° C., with coke breeze, with iron ore and with flux in sufficient quantities to result in a semi-molten mass, wherein said mass is at a temperature up to 1200° C., and wherein said coke breeze is dispersed uniformly in said mass; reacting said mass for two hours at 1200° C. to reduce the iron values into elemental iron; heating said semi-molten mass containing elemental iron to a temperature at which said elemental iron is molten; and separating said molten iron from the remaining semi-molten mass.

References Cited in the file of this patent
UNITED STATES PATENTS

| | | |
|---|---|---|
| 1,300,410 | Johnson | Apr. 15, 1919 |
| 2,035,016 | Simcox et al. | Mar. 24, 1936 |
| 2,395,029 | Baily | Feb. 19, 1946 |